United States Patent

[11] 3,555,998

| [72] | Inventor | Edgar N. Meakin |
| | | 372 Roblar Ave., Hillsborough, Calif. 94010 |
| [21] | Appl. No. | 732,366 |
| [22] | Filed | May 27, 1968 |
| [45] | Patented | Jan. 19, 1971 |

[54] STEAM JACKETED SCREW COMPACTION CONVEYOR
9 Claims, 5 Drawing Figs.

| [52] | U.S. Cl. ........................................... | 100/93, 100/145 |
| [51] | Int. Cl. ........................................... | B30b 3/00 |
| [50] | Field of Search ............................... | 100/92, 93, 144, 145, 146, 147, 148, 149, 150, 117; 18/12 |

[56] References Cited

UNITED STATES PATENTS

| 2,565,947 | 8/1951 | Burghauser .................. | 100/145 |
| 2,583,600 | 1/1952 | Schreiber ..................... | 100/145UX |
| 3,422,748 | 1/1969 | Gilman ......................... | 100/93 |

FOREIGN PATENTS

| 450,803 | 7/1936 | Great Britain ................ | 100/148 |
| 104,151 | 4/1923 | Switzerland .................. | 100/150 |

*Primary Examiner*—Peter Feldman
*Attorney*—Bruce & McCoy

ABSTRACT: A steam jacketed screw compaction conveyor comprising a housing having a cylindrical bore with longitudinal ridges secured to the walls of the bore and an impeller body rotatably supported in the bore of the housing and having a multiplicity of helical blades surrounding the impeller body.

INVENTOR.
EDGAR N. MEAKIN 3,555,998

STEAM JACKETED SCREW COMPACTION CONVEYOR

BACKGROUND OF THE INVENTION

1. Field of the Invention

The present invention relates to pellet mills and, more particularly, to a steam jacketed screw compaction conveyor for use with a pellet mill in place of a mixer for preheating, mixing, and compacting bulk material before the material is fed to the mill.

Generally, pelleting processes take a loose bulky material and compress it into a variety of pellet shapes and sizes possessing increased bulk density. The result is a compact, tough, dust-free product that is usually free-flowing and uniform in size, color, and appearance.

2. Description of the Prior Art

Many different types of pelleting machines have been utilized to effect the pelleting process. However, most machines which process vegetable matter by forcing the material through a die include a mixer which preprocesses the material. This increases the density of the material and mixes the ingredients in order that the pelleting process is made more efficient by providing the pellet mill with a uniformly mixed and relatively dense product. In the past, this operation has been performed by a number of different type mixing machines which mechanically mix and compact the material without the use of heat, other than that generated by friction.

It has been found that if the product can be heated in addition to being compacted during the mixing process, that the fiber structure of the vegetable matter is partially broken down and the resulting bulk material product can be fed to the pelleting machine in a more uniform and denser condition. This increases the efficiency and capacity of the pelleting machine.

SUMMARY OF THE INVENTION

The present invention is a steam jacketed screw compaction conveyor comprising a housing having a generally cylindrical bore with a bulk material inlet at one end thereof, a process material discharge at the other end thereof, and a jacket means for containing a heating fluid in surrounding relation around at least a portion of the housing. A hollow generally cylindrical impeller body is disposed in the bore of the housing and is supported for rotation therein. The impeller body has an expanding diameter for at least a portion of its length in a direction toward the discharge end thereof. At least one helical blade surrounds and is secured to the impeller body for at least a portion of the length thereof. Shear means are formed on the wall of the cylindrical bore of the housing for cooperating with the helical blade of the impeller to move bulk material along the bore when the impeller rotates with respect to the housing. A heating fluid injection and removal means is provided for inducing a heating fluid into the hollow interior of the impeller body.

Bulk material is fed into the housing inlet where it is moved into the bore of the housing by the helical blade of the impeller. Steam is fed to the jacket of the housing, and to the interior of the impeller body, to heat the two walls between which the bulk material is compressed. The material is heated, compressed, and mixed as it passes through the bore of the housing.

It is therefore an important object of the present invention to provide a mixer for a feed mill which compacts the bulk material prior to processing in the pellet mill.

It is another object of the present invention to provide a mixer which heats the bulk material before it is introduced into the pellet mill.

It is a further object of the present invention to provide a mixer for a pellet mill which simultaneously compacts, heats, and mixes bulk material before it is fed to the pellet mill.

And still another object of the present invention is to provide a relatively compact and small size mixer for a pellet mill which is of a relatively simple construction and design for trouble free operation.

DESCRIPTION OF THE DRAWINGS

FIG. 5 is a side elevation in cross section of the injection and removal means for inducing a heating fluid into the hollow interior of the impeller body.

DESCRIPTION OF THE PREFERRED EMBODIMENT

Figure 1:
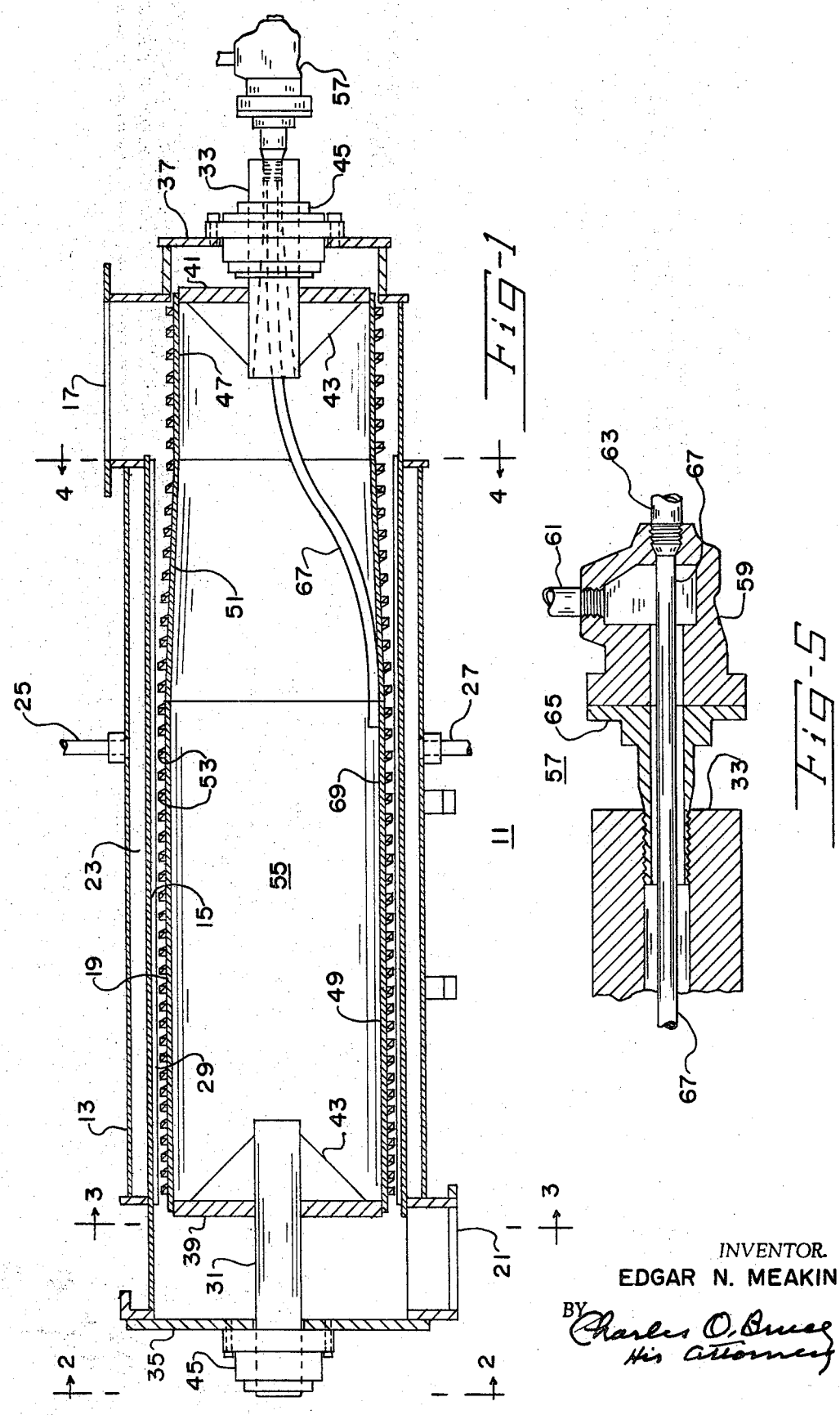
FIG. 1 is a side elevation in section of the steam jacketed screw compaction conveyor of the present invention.
Figure 2:
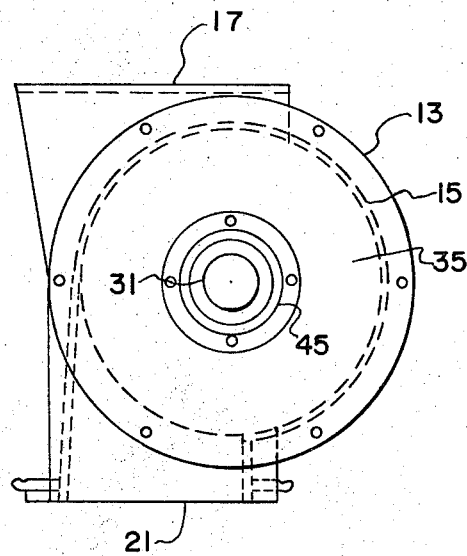
FIG. 2 is an end elevation of the discharge end of the present invention.
Figure 3:
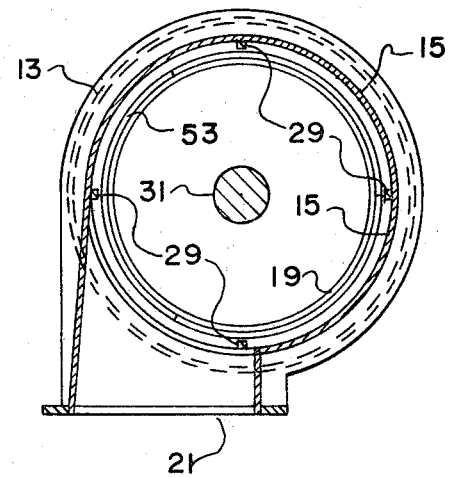
FIG. 3 is an end elevation in section taken along lines 3–3 of FIG. 1.
Figure 4:
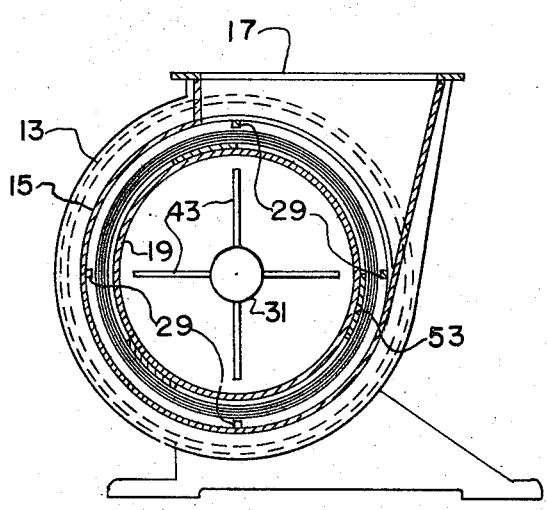
FIG. 4 is an end elevation in section taken along lines 4–4 of FIG. 1.

Reference is made to FIG. 1 of the drawings for a description of the preferred embodiment of the invention. There shown is a steam jacketed screw compaction conveyor 11. It includes a housing 13 having a generally cylindrical bore 15. A bulk material inlet 17 is arranged at the top of the housing adjacent one end thereof. The inlet is actually disposed offset to one side of the vertical center plane of the housing. This arrangement causes the bulk material to be fed substantially tangential to the impeller 19 so that the material can be squeezed between the wall of the housing bore and the external surface of the impeller body.

A processed material discharge 21 is disposed at the other end of the housing on the bottom side thereof whereby it can be connected directly to the feed inlet of a pellet mill.

The housing includes a jacket means 23 for containing a heating fluid in surrounding relation around at least a portion of the housing. The jacket means is a double wall formed in the housing and designed to contain pressurized steam. An upper steam inlet 25 and a lower condensate outlet 27 are provided in the jacket.

Shear means are formed on the wall of the cylindrical bore of the housing to coact with the impeller to move the material through the machine. The shear means are actually longitudinal ridges 29 which in the simplest form comprise straight bars, having square edges, secured to the wall of the bore.

The hollow generally cylindrical impeller body 19 is disposed in the bore of the housing and supported for rotation therein. In the present embodiment, a pair of shafts 31, 33 extend through the end plates 35, 37 of the housing and are secured through the end walls 39, 41 of the impeller. Gussets 43 are welded to the journaled shafts 31, 33 and end walls 39, 41 of the impeller body for structural support. The shafts are supported by bearings 45 in the end walls of the housing.

The impeller body 19 is divided into three different sections having different cross-sectional diameters. The inlet section 47 is arranged at the inlet end of the impeller body proximate the inlet of the housing. It has a first cross-sectional diameter which is smaller than the bore of the housing in order to permit the bulk material to be forced into the housing around the impeller body. The discharge section 49 of the impeller body has a second cross-sectional diameter which is larger than the first cross-sectional diameter whereby the clearance between the bore of the housing and the body of the impeller is less than that at the inlet end of the machine. An intermediate section 51 of the impeller body has an expanding diameter toward the discharge end and interconnects the inlet and discharge sections.

A multiplicity of helical blades 53 surround and are secured to the impeller body. A portion of the length of the helical blades on the impeller body has an increasing pitch toward the inlet end which starts from the discharge end thereof. In other words, the space between the blades is the smallest at the discharge end and increases proportionately toward the intermediate section of the impeller body. The pitch then remains constant for the length of the intermediate section to the end of the body at the inlet end.

A heating fluid injection and removal means is provided at the inlet end of the body for inducing a heating fluid into the hollow interior 55 of the impeller body. This is effected by a rotatable steam coupling 57 which is secured to the hollow supporting shaft at the inlet end of the housing. The coupling has a fixed portion 59 attached to which are a steam supply line 61 and a condensate removal line 63. A rotatable portion 65 of the coupling is in effect secured to the rotating impeller body 19 by means of the supporting shaft 33. The steam and condensate lines communicate with the interior of the impeller body through the rotatable portion of the coupling. This coupling is readily available on the commercial market.

The intake end of the condensate removal tube 67 depends from the axis of the supporting shaft to the lowest point in the impeller body, i.e., near the lower surface 69 of the impeller body internal wall. Steam is injected into the chamber through the hollow shaft 33 and the condensate is removed from the chamber through the inner tube 67 by suction or steam pressure.

Bulk material is forced into the machine by gravity or by a pressure feed whereby it enters the inlet of the compaction conveyor and is forced tangentially into the space between the bore of the housing and the wall of the impeller body. It is immediately subjected to the heat due to the walls of the impeller body and the housing bore being steam heated. The material is moved toward the discharge end by the helical blades.

As the material moves onto the section of impeller body which interconnects the inlet and discharge sections, the expanding diameter of the body compresses the material outward toward the wall of the bore of the housing. Thus, the feed material is subjected to simultaneous heating and compaction as a result of being compressed against the impeller body in the bore of the housing.

After the material passes off of the interconnecting section of the impeller body onto the constant diameter discharge section, it is subjected to further compaction and continuous heating as a result of the reducing pitch of the helical blades. The decrease in blade pitch continuously compacts the material longitudinally until it is discharged from the impeller body through the discharge end of the pellet mill.

The longitudinal ridges in the bore of the housing coact with the helical blades of the impeller to move the bulk material through the machine by preventing the bulk material from rotating with the blades. The material rotates with the screw until it is forced against one of the ridges which then tries to shear the material. However, the material resists the shear and as a result is moved along the housing by the helical blades. If the shear means were not included in the bore of the housing, then it would be necessary to force the material into the housing under pressure in order to move it through the machine since it would simply rotate with the helical blades rather than be moved by them.

The ridges in the bore of the housing need not be straight. They can be helical, preferably with a reverse helix to that on the impeller body, however, even if the helix is in the same direction as the impeller body, but of a greater pitch than the helix of the blades on the impeller, then the material will be moved.

The most economical and easiest way to construct the ridges is to place simply four rectangular cross-sectional bars along the straight portion of the wall of the cylindrical housing and weld them in place. The wide spacing between the bars permits most of the material to contact the wall of the housing to effect efficient heat transfer.

The present invention has many advantages; the most evident being that it simultaneously compacts, heats, and mixes the material being fed to the pellet mill. The machine for achieving this result is of a very simple construction whereby there are very few moving parts; only the rotation of the impeller body with respect to the housing.

The efficient heat transfer and precompaction of the bulk material which is accomplished by this invention is achieved through the use of the particular structural arrangement of the invention and is a direct function of the design. The invention is a relatively small and compact unit for providing the multiple processing effects that are achieved.

It will be apparent from the foregoing description of the invention, in its preferred form, that it will fulfill all the objects attributable thereto, and while it has been illustrated and described in considerable detail, the invention is not to be limited to such details as have been set forth except as may be necessitated by the appended claims.

I claim:

1. A screw compaction conveyor comprising:
   a housing having a generally cylindrical bore with a bulk material inlet adjacent one end thereof, and a processed material discharge at the other end thereof;
   a generally cylindrical impeller body disposed in the bore of said housing and supported for rotation therein, said impeller body having an expanding diameter for at least a portion of its length in a direction toward the discharge end thereof;
   at least one helical blade surrounding and secured to said impeller body for at least a portion of its length, said blade having a uniform width and projecting from said impeller body a uniform height throughout its length; and
   shear means formed on the wall of the cylindrical bore of said housing for cooperating with the helical blade of said impeller to move bulk material along said bore when said impeller rotates with respect to said housing.

2. The screw compaction conveyor of claim 1 wherein said shear means includes a multiplicity of longitudinal ridges formed on the walls of the bore of said housing.

3. The screw compaction conveyor of claim 2 wherein said ridges are straight.

4. A steam jacketed screw compaction conveyor comprising:
   a housing having a generally cylindrical bore with a bulk material inlet adjacent one end thereof, a processed material discharge at the other end thereof, and a jacket means for containing a heating fluid in surrounding relation around at least a portion of said housing;
   a hollow generally cylindrical impeller body disposed in the bore of said housing and supported for rotation therein, said impeller body having an expanding diameter for at least a portion of its length in a direction toward the discharge end thereof;
   At least one helical blade surrounding and secured to said impeller body for at least a portion of its length, said blade having a uniform width and projecting from said impeller body a uniform height throughout its length;
   shear means formed on the wall of the cylindrical bore of said housing for cooperating with the helical blade of said impeller to move bulk material along said bore when said impeller rotates with respect to said housing, said shear means including a multiplicity of straight longitudinal ridges formed on the walls of the bore of said housing; and
   heating fluid injection and removal means for inducing a heating fluid into the hollow interior of said impeller body.

5. The steam jacketed screw compaction conveyor of claim 4 wherein said helical blade has an increasing pitch toward the inlet end for at least a portion of its length of said impeller body starting proximate the discharge end thereof.

6. The steam jacketed screw compaction conveyor of claim 4 wherein said impeller body is surrounded by a multiplicity of helical blades secured thereto having an increasing pitch toward the inlet end for a portion of the length of said body starting from the discharge end thereof.

7. The steam jacketed screw compaction conveyor of claim 4 wherein said impeller body includes an inlet section having a first diameter of cross section disposed at the inlet end of said housing, a discharge section having a second diameter of cross section larger than said inlet section, and an intermediate tapering section interconnecting said inlet and discharge sections.

8. The steam jacketed screw compaction conveyor of claim 7 wherein said inlet section of said impeller extends along the bore of said housing substantially a length equal to the length of said bulk material inlet and said intermediate section extends from the discharge end of said inlet section for a portion of the length of the bore of said housing effecting a compaction chamber in said bore.

9. A steam jacketed screw compaction conveyor comprising:

a housing having a generally cylindrical bore with a bulk material inlet adjacent one end thereof, a processed material discharge at the other end thereof, a jacket means for containing a heating fluid in surrounding relation around at least a portion of said housing, and a multiplicity of straight longitudinal ridges formed on the walls of the bore of said housing;

a hollow, generally cylindrical impeller body disposed in the bore of said housing and supported for rotation therein, said body having an inlet section of a first cross section diameter, a discharge section of a second cross section diameter larger than said first cross section diameter, and an intermediate section of increasing cross section diameter toward the discharge end of said impeller interconnecting said inlet and discharge sections, said inlet of said housing being disposed to one side of the vertical center plane of said housing to feed the bulk material substantially tangentially to said impeller body;

a multiplicity of helical blades surrounding and secured to said impeller body and having an increasing pitch toward the inlet end for a portion of the length of said body starting from the discharge end thereof, each of said blades having a uniform width and projecting from said impeller body a uniform height throughout its length; and heating fluid injection and removal means for inducing a heating fluid into the hollow interior of said impeller body.